(12) United States Patent
Hsu et al.

(10) Patent No.: US 7,898,626 B2
(45) Date of Patent: Mar. 1, 2011

(54) DISPLAY HAVING STRUCTURES TO REGULATE ORIENTATION OF LIQUID CRYSTAL MOLECULES

(75) Inventors: Che-Ming Hsu, Tainan (TW); Ming-Feng Hsieh, Tainan (TW); Chin-Yung Hseih, Tainan (TW); Chien-Hong Chen, Tainan (TW)

(73) Assignee: Chimei Innolux Corporation (TW)

( * ) Notice: Subject to any disclaimer, the term of this patent is extended or adjusted under 35 U.S.C. 154(b) by 0 days.

(21) Appl. No.: 12/467,600

(22) Filed: May 18, 2009

(65) Prior Publication Data
US 2009/0310049 A1 Dec. 17, 2009

Related U.S. Application Data

(63) Continuation of application No. 11/240,340, filed on Sep. 30, 2005, now Pat. No. 7,535,532.

(30) Foreign Application Priority Data

Sep. 30, 2004 (TW) .............................. 93129719 A

(51) Int. Cl.
*G02F 1/1337* (2006.01)
(52) U.S. Cl. ......................................... 349/130; 349/129
(58) Field of Classification Search .................. 349/129, 349/130
See application file for complete search history.

(56) References Cited

U.S. PATENT DOCUMENTS

| 7,304,703 | B1 * | 12/2007 | Takeda et al. ................. | 349/129 |
| 2002/0060764 | A1 | 5/2002 | Taniguchi | |
| 2005/0030458 | A1 * | 2/2005 | Sasabayashi et al. ......... | 349/129 |

FOREIGN PATENT DOCUMENTS

JP 2004301879 10/2004

* cited by examiner

*Primary Examiner* — John Heyman
(74) *Attorney, Agent, or Firm* — Trop Pruner & Hu, P.C.

(57) ABSTRACT

A liquid crystal display includes a first substrate and a second substrate, a liquid crystal between the first and second substrates, and first and second structures provided on the first and second substrates to regulate orientation of liquid crystal molecules in the liquid crystal layer.

10 Claims, 14 Drawing Sheets

DISPLAY HAVING STRUCTURES TO REGULATE ORIENTATION OF LIQUID CRYSTAL MOLECULES

This is a continuation of U.S. Ser. No. 11/240,340, filed Sep. 30, 2005 now U.S. Pat. No. 7,535,532, which claims foreign priority under 35 U.S.C. §119 of Taiwan Application 93129719, filed Sep. 30, 2004, both hereby incorporated by reference.

TECHNICAL FIELD

This invention relates generally to liquid crystal displays (LCDs).

BACKGROUND

A liquid crystal display (LCD) typically includes a unit having two glass substrates (or other types of substrates) that face each other, with a liquid crystal layer sandwiched between the substrates. An LCD in a vertically aligned (VA) mode uses negative liquid crystal material and vertically aligned film. When not supplied with a voltage, the liquid crystal molecules in the liquid crystal layer are arranged in a vertical direction (with respect to the main surfaces of the substrates) and the VA LCD cannot be penetrated by an incident light, resulting in a dark display. When supplied with a preset voltage, liquid crystal molecules are arranged in a horizontal direction and the VA LCD can be penetrated by an incident light, resulting in a white display.

However, when viewed at an angle not perpendicular to the display, a user may perceive a contrast reduction or contrast reversal problem with a VA LCD. This is the result of interaction of the light with the liquid crystal molecules within the LCD. When traveling through the LCD in a direction that is not at a right angle of incidence, the light interacts with the liquid crystal molecules in a way different from that when the light travels through the LCD in a direction at a right angle of incidence. Therefore, the contrast between the state when the light penetrates (white) and the state when the light does not (black) will drop significantly when the light is not at a right angle of incidence. This results in unsatisfactory performance of VA LCDs in many applications (e.g., flat television displays and large computer displays).

A larger viewing angle can be provided by an LCD in MVA (multi-domain vertical alignment) mode. In an MVA LCD, improvement in viewing angle is achieved by setting the orientations of the liquid crystal molecules within each pixel of the display to a plurality of different directions. In some conventional MVA LCDs, a multi-domain regulation is provided to improve the display's performance at various viewing angles. Typically, this multi-domain regulation is achieved by providing a plurality of slits in the pixel electrode of the thin film transistor substrate and a plurality of protrusions at the common electrode of the color filter substrate, where the protrusions and slits are arranged in an alternating fashion. The aligned orientation of the liquid crystal molecules depends on the fringe field produced by the pattern of the protrusions and slits.

To drive an LCD, a voltage is applied to cause the corresponding liquid crystal molecules within each pixel to switch. The switching of the molecules will change the light transmittance of each pixel. In response to switching of the liquid crystal molecules, the LCD will provide different brightness. For most LCDs, the higher the applied voltage, the quicker the response if the initial voltage is kept constant. However, this quicker response time at higher applied voltages may not be true with certain LCDs, such as LCDs in the patterned vertical alignment (PVA) mode and MVA mode. In such LCDs, under certain circumstances, the LCDs may respond slower when a higher voltage is applied.

FIG. 11A shows an arrangement of protrusions and slits in the pixel area of a conventional MVA LCD. FIG. 11B shows a cross-section along line A-A in FIG. 11A. As depicted in FIG. 11A, a pixel area 400 of the LCD is defined generally near the intersection of a gate line 402 and a data line 404. The pixel area 400 has a thin film transistor (TFT) 406, which is electrically connected to the gate line 402 and the data line 404. The pixel area 400 also contains a pixel electrode 419 that is connected to the TFT 406.

As depicted in FIG. 11B (cross section along line A-A' in FIG. 11A), protrusions 410 and slits 412, provided in the pixel area 400, are formed in a color filter substrate 414 and a TFT substrate 416, respectively. The arrangement of protrusions 410 and slits 412 depicted in FIGS. 11A-11B causes the liquid crystal molecules and the penetration axis of the upper and lower polarizers (not shown) to be oriented such that the liquid crystal molecules and the penetration axis of the upper and lower polarizers form an angle of 45°, which enables the MVA LCD to provide maximum gray scale brightness due to light traveling through the MVA LCD. However, when the orientation of the liquid crystal molecules and the penetration axis of the upper and lower polarizers (not shown) fail to form an angle of 45° under regulation of protrusion 410 and slit 412, which may occur when a gap between protrusions and slits becomes too large, disclination of the liquid crystal molecules occurs. In a liquid crystal cell, disclination refers to the orientation of the liquid crystal molecules changing uncontinuously at a point or a line. Disclination of liquid crystal molecules results in the MVA LCD not being able to provide maximum gray scale brightness.

FIGS. 12A-E simulate the switching of the liquid crystal molecules in area 419 of FIG. 11A. The switching, which is observed within the same time duration, is caused by the fringe field produced by the pattern of the protrusions and slits when different voltages are applied. The transverse axis and vertical axis in FIGS. 12A-E correspond to directions A-A' and A-B of FIG. 11A, respectively. As shown in FIGS. 12A and 12B, when the voltage applied is 5V and 5.5V, respectively, the liquid crystal molecules in area 418 are arranged by the fringe field in a normal pattern. However, as shown in FIGS. 12C-E, when the voltage applied rises to 5.75V, 6.0V, and 6.5V, liquid crystal molecules in several regions (e.g., 420a and 420b) of the area 418 will not be arranged by the fringe field, and as a result, disclination occurs in regions 420a and 420b. Disclination is worse in regions 420a and 420b of FIG. 12E, which shows the result of an applied voltage of 6.5V.

BRIEF DESCRIPTION OF THE DRAWINGS

Some embodiments of the invention are described with reference to the following figures.

DETAILED DESCRIPTION

Figure 1:
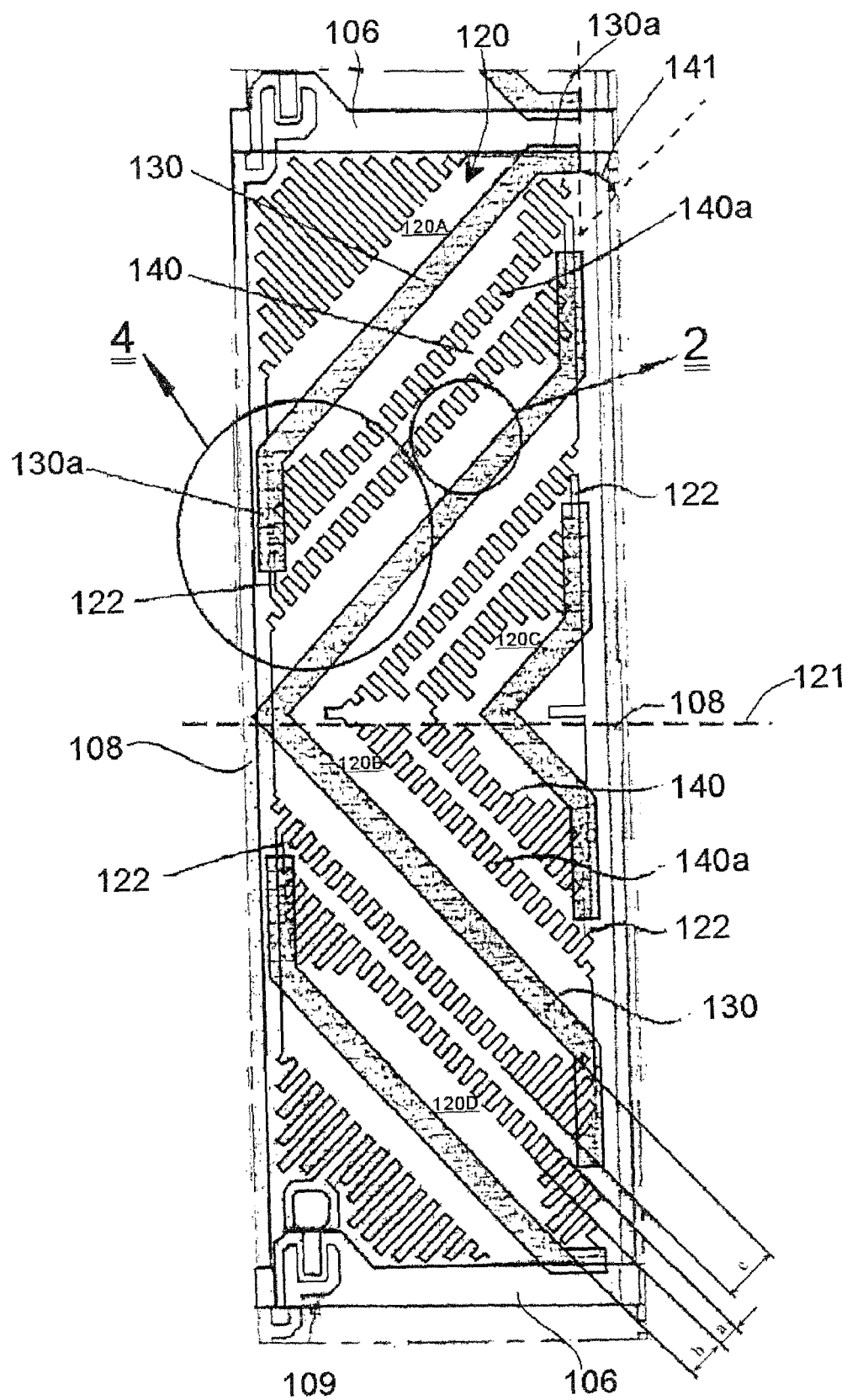
FIGS. 1-7 depict pixel regions of MVA (multi-domain vertical alignment) liquid crystal displays (LCDs) according to several embodiments of the invention.

In accordance with some embodiments, an MVA (multi-domain vertical alignment) LCD (liquid crystal display) with a high aperture ratio is provided. Such an MVA LCD generally includes first and second substrates processed for vertical alignment, a liquid crystal layer sandwiched between the first and second substrates, and an arrangement of protrusions and slit patterns provided on the first and second substrates. A "protrusion" is a structure that projects outwardly away from a surface of another structure, such as a common electrode, pixel electrode, or other structure. A "slit pattern" includes a pattern of slits (which are basically openings formed in a surface). Protrusions and slits are structures that regulate orientations of liquid crystal molecules in the liquid crystal layer.

The liquid crystal molecules in the liquid crystal layer are aligned generally perpendicularly to the principal surface of the first substrate when no substantial electric field is applied to the liquid crystal layer. The protrusions and slit patterns regulate the orientation of the liquid crystal molecules to obliquely align the liquid crystal molecules in a plurality of directions when a voltage is applied, which provides improved viewing angle of the MVA LCD. In other words, the liquid crystal molecules are inclined in a plurality of different directions when a voltage is applied. The protrusions and slit patterns are generally parallel to each other and are arranged in an alternating fashion.

In some embodiments, a plurality of protrusions are arranged in arrays on the first substrate, and a plurality of slit patterns are arranged in arrays at pixel electrodes on the second substrate. Alternatively, the slit patterns can be provided at a common electrode on the first substrate, while the protrusions are provided on the second substrate. In yet another arrangement, both protrusions and slit patterns can be provided on each of the first and second substrates. In further embodiments, protrusions can be formed on both the first and second substrates, or slit patterns can be formed on both the first and second substrates.

Optionally, in some embodiments, an improved pixel voltage driving technique is employed, such as that described in U.S. Ser. No. 11/198,141, entitled "Method and Apparatus for Driving a Pixel Signal," filed Aug. 5, 2005, which is hereby incorporated by reference. The improved pixel voltage driving technique involves multi-step voltage application, in which a pixel signal is provided (on a data line) to the pixel selected by a scan line (or gate line), where the pixel signal is driven from an initial voltage to an intermediate voltage (larger than the initial voltage), then after a time interval, from the intermediate voltage to a target voltage (larger than the intermediate voltage). The multi-step driving technique causes an initial voltage of the pixel signal to rise to an intermediate voltage by adding a first bias voltage smaller than the critical bias voltage (also referred to as a reversed bias voltage) in frame time t1. Next, in frame time t2, a second bias voltage is added to the intermediate voltage to further increase the driving voltage from the intermediate voltage up to the target voltage of the pixel signal. By using this driving method, the response time of pixels is improved by using the multi-step voltage application technique.

According to optical-electronic characteristics of liquid crystal molecules, a pixel has a reversed bias voltage $v_{cg1}$ corresponding to an initial voltage via. When an instant variation (a bias voltage) of a driving voltage is larger than the reversed bias voltage $v_{cg1}$, liquid crystal molecules of the pixel may switch abnormally, which may lead to increased response times of the pixel.

Figure 9A:
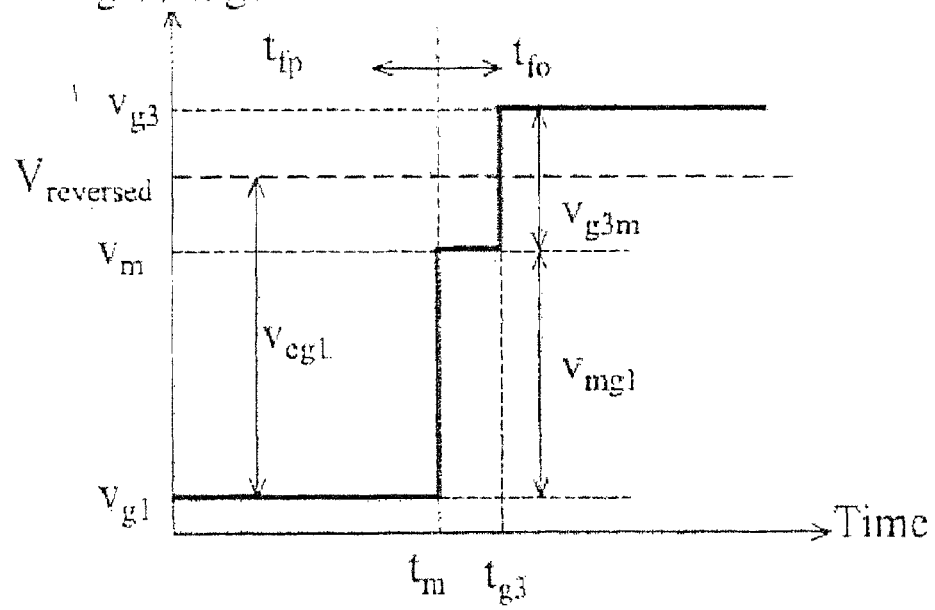
FIG. 9A is a graph of a driving voltage of a pixel as a function of time according to a multi-step driving technique according to an embodiment.

To avoid this undesirable situation, as shown in FIG. 9A, according to an embodiment of the multi-step driving technique, the pixel signal has an initial voltage $v_{g1}$ during a current frame period $t_{fc}$. The initial voltage $v_{g1}$ may be the target voltage for the pixel in a previous frame period $t_{fp}$. The multi-step driving technique according to some embodiments of the invention supplies bias voltages in plural steps from the initial voltage $v_{g1}$ to the target voltage $V_{g3}$ to avoid a voltage step greater than the reversed bias voltage $v_{cg1}$. As depicted in FIG. 9A, this means that a voltage step from the initial voltage $v_{g1}$ to a voltage greater than the reversed voltage $V_{reversed}$ (the reversed voltage $V_{reversed}$ is a voltage of the initial $v_{g1}$ voltage plus the reversed bias voltage $v_{cg1}$ of the pixel) is avoided. At a time $t_m$, which is at or near the beginning of the current frame period $t_{fc}$, a first bias voltage $v_{mg1}$ is supplied Application of the first bias voltage $v_{mg1}$ causes a voltage step from the initial voltage to the higher intermediate voltage $v_m$, where $V_{mg1} < v_{cg1}$. Then, at a time $t_{g3}$, which occurs a time interval after $t_m$, a second bias voltage $v_{g3m}$ is supplied, which causes the driving voltage to increase from the intermediate voltage $v_m$ to the higher target voltage $v_{g3}$. The intermediate voltage supplied to the pixel is maintained constant at the intermediate voltage $v_m$ for a time interval between $t_m$ and $t_{g3}$.

Note that the time interval $t_{g3}$-$t_m$ of the multi-step driving technique (time interval during which the applied voltage steps from the initial voltage to the intermediate voltage than to the target voltage) may in some embodiments be less than the current frame period ($t_{fc}$). A "frame" represents a complete image from a series of images. A "frame period" contains an active period and a blanking period, where the active period is the time period to drive all pixels of an LCD panel, and the blanking period is used to match the period for blanking performed in CRT (cathode ray tube) monitors.

As noted above, different initial voltages correspond to different reversed bias voltages. Thus, after the voltage has been driven to the intermediate voltage $v_m$, it should be noted that the intermediate voltage itself is associated with its respective reversed bias voltage $v_{cm}$ (not shown). Therefore, the second bias voltage $v_{g3m}$ applied at time $t_{g3}$ should be smaller than this reversed bias voltage $v_{cm}$. The issue of abnormal switching of liquid crystal molecules and slower response time of the pixel are usually more pronounced at lower initial voltages, so it is usually more productive to reduce the magnitude of the first bias voltage $v_{mg1}$ than the subsequent applied bias voltage after elevation of the applied voltage to the intermediate voltage.

Figure 9B:
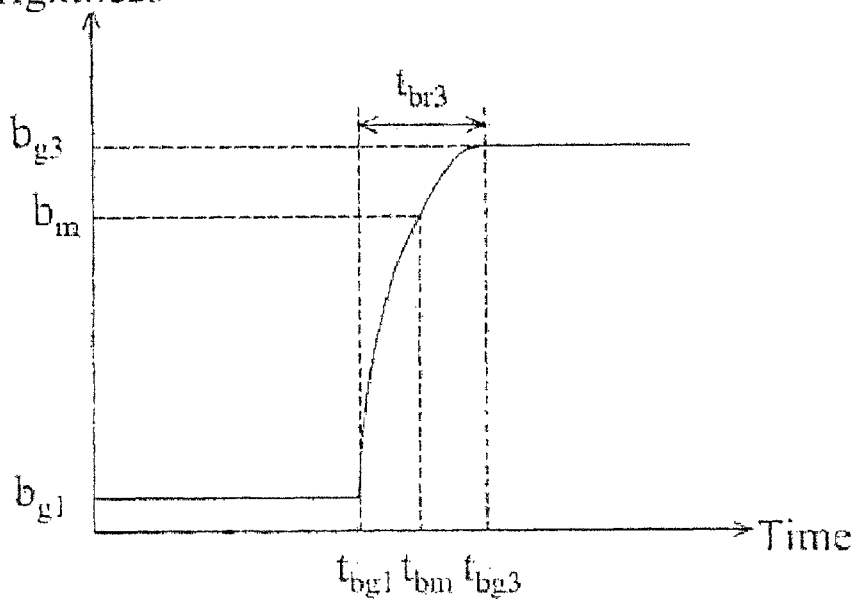
FIG. 9B is a graph of a brightness of the pixel as a function of time in response to the driving voltage of FIG. 9A.

FIG. 9B is a diagram showing changes of pixel luminance in relation to time in response to the voltages applied in FIG. 9A. In response to the voltage being raised to the intermediate voltage $v_m$ that is less than the bias voltage in the interval between time $t_m$ and the time $t_{g3}$, the luminance of the pixel is raised from an initial luminance $b_{g1}$ to an intermediate luminance $b_m$. In response to the subsequent raising of voltage from $v_m$ to $V_{g3}$, the luminance is raised continuously to a target luminance $b_{g3}$. Because the first bias voltage $v_{mg1}$ supplied by the multi-step driving technique is less than the reversed bias voltage $v_{cg1}$, the liquid crystal molecules within the pixel can rotate normally (in other words, the liquid crystal molecules are not caused to rotate in the wrong directions), and the luminance of the pixel can be raised to the predetermined target luminance $b_{g3}$ with improved response time.

Figure 10:
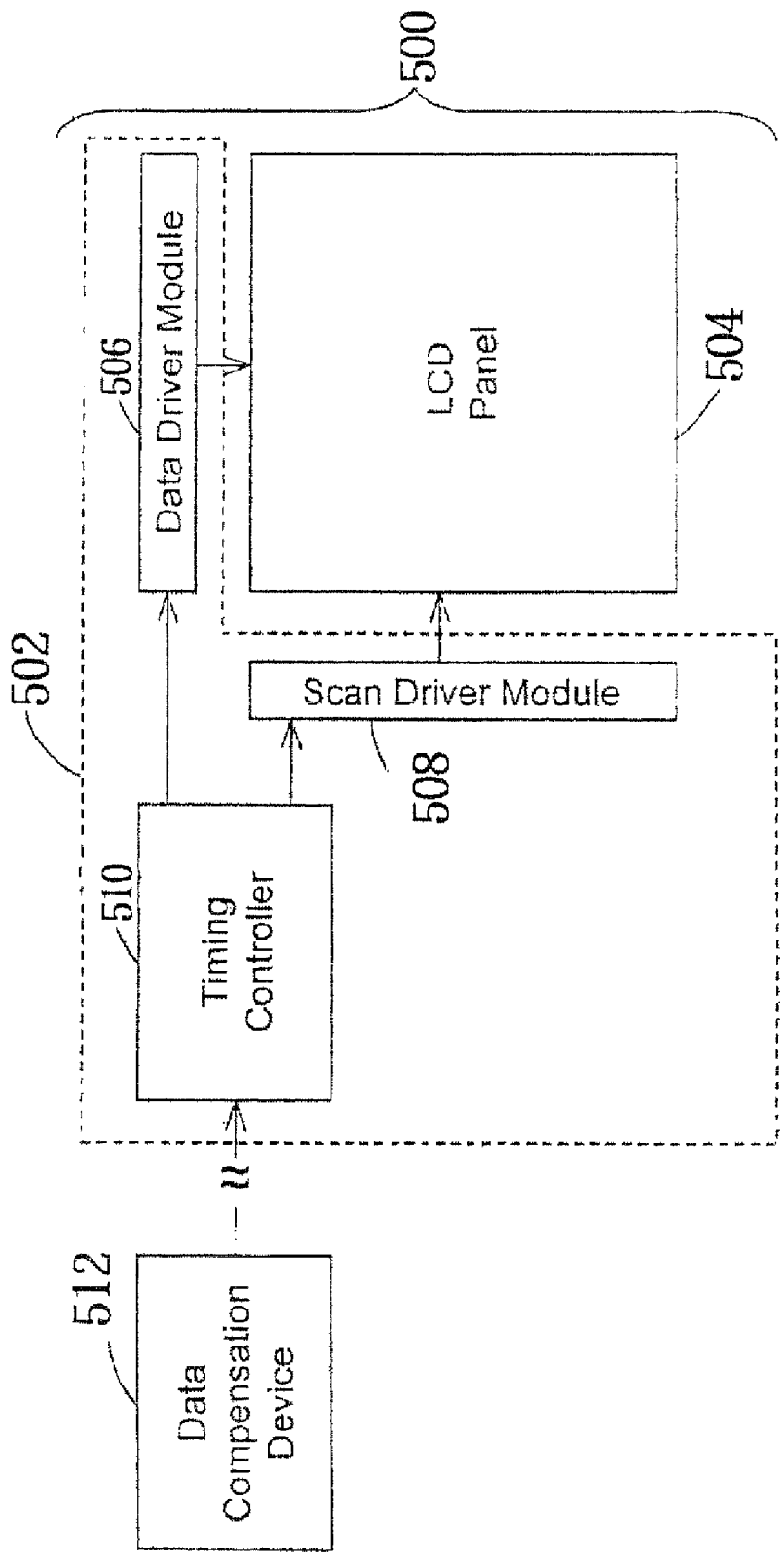
FIG. 10 is a block diagram of a display module and a data compensation device, according to an embodiment.
Figure 11A:
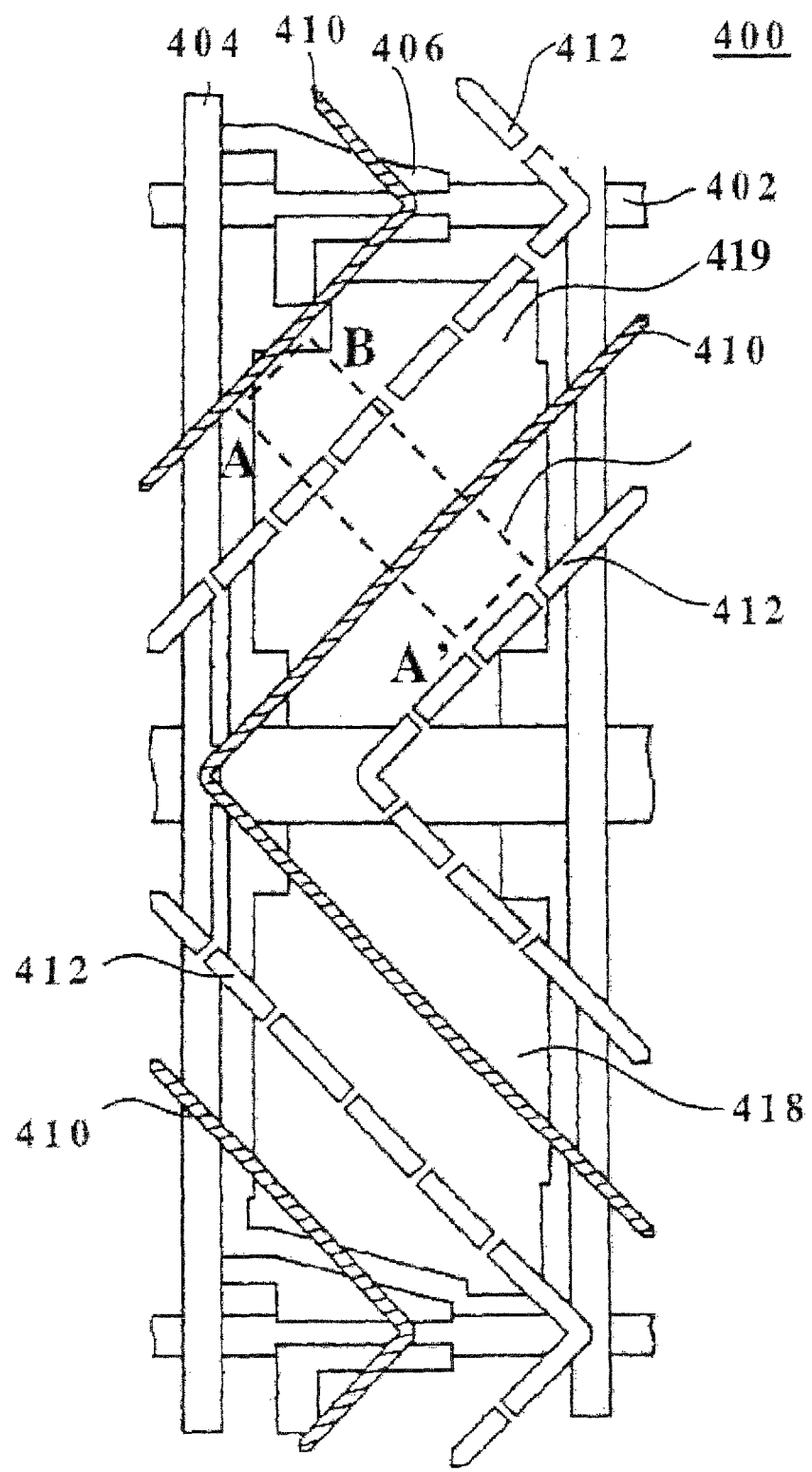
FIGS. 11A-11B illustrate an arrangement of a portion of a conventional MVA LCD.
Figure 11B:
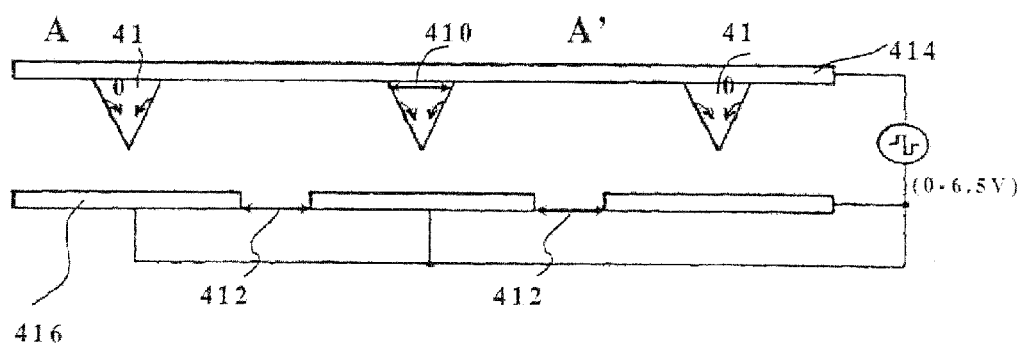
Figure 12A:
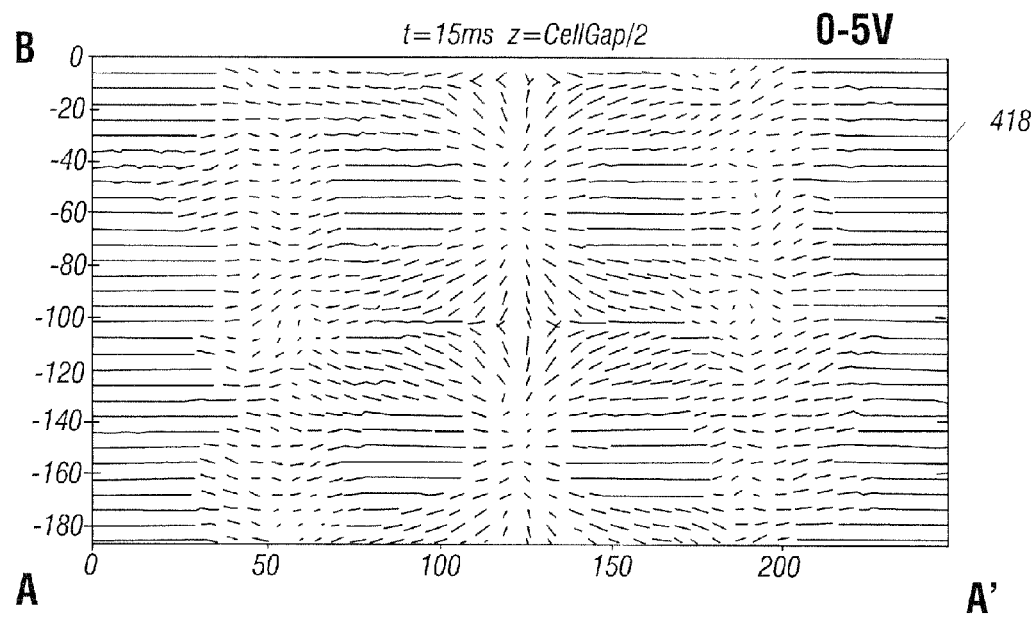
FIGS. 12A-12E illustrate simulated switching of liquid crystal molecules in the conventional MVA LCD of FIGS. 11A-11B.
Figure 12B:
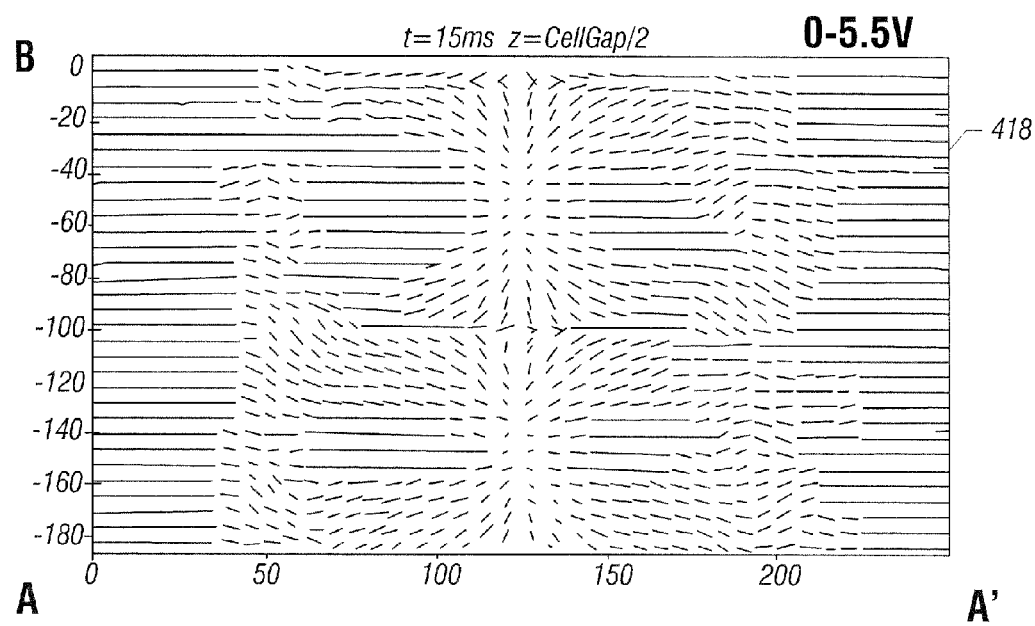
Figure 12C:
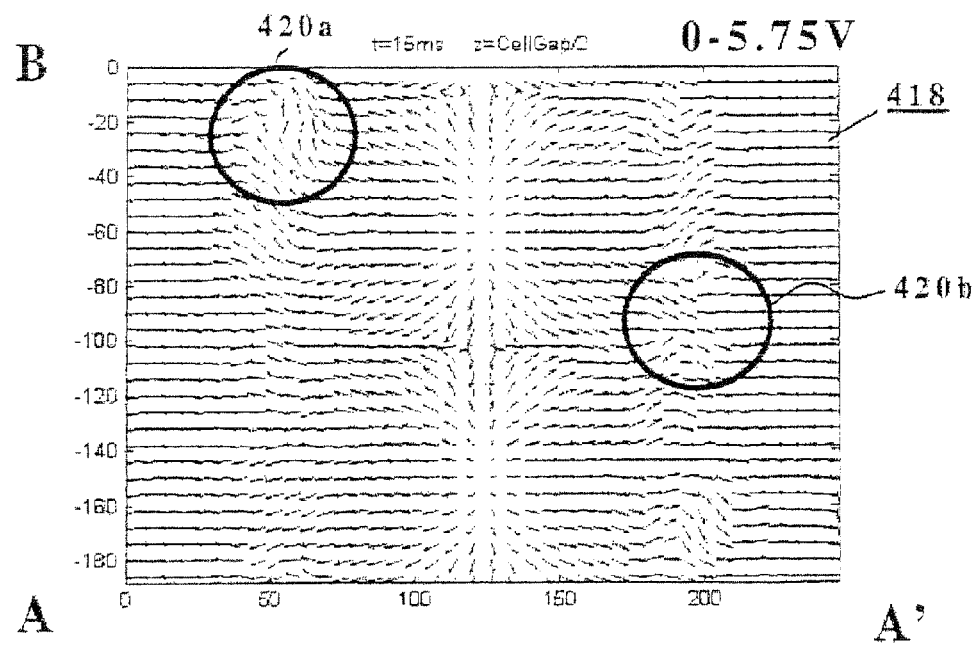
Figure 12D:
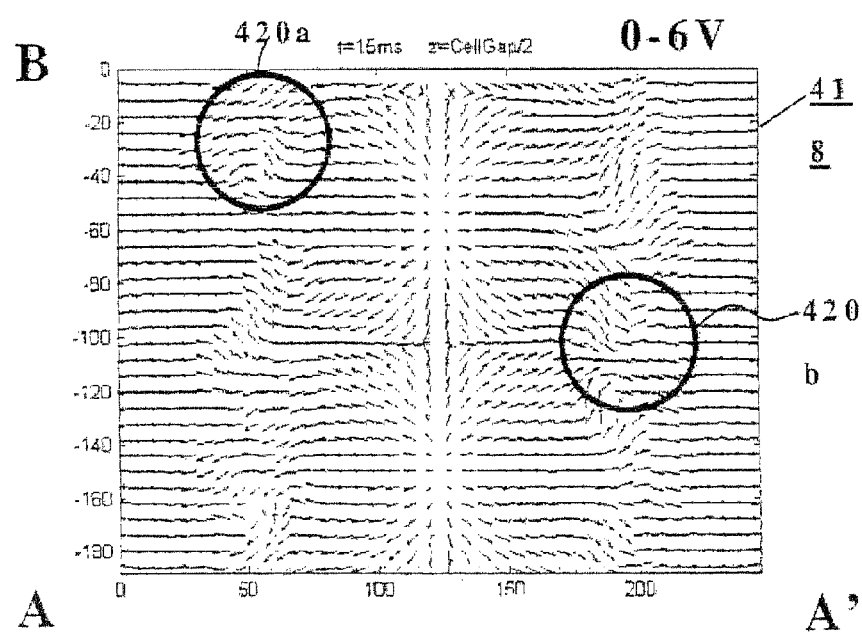
Figure 12E:
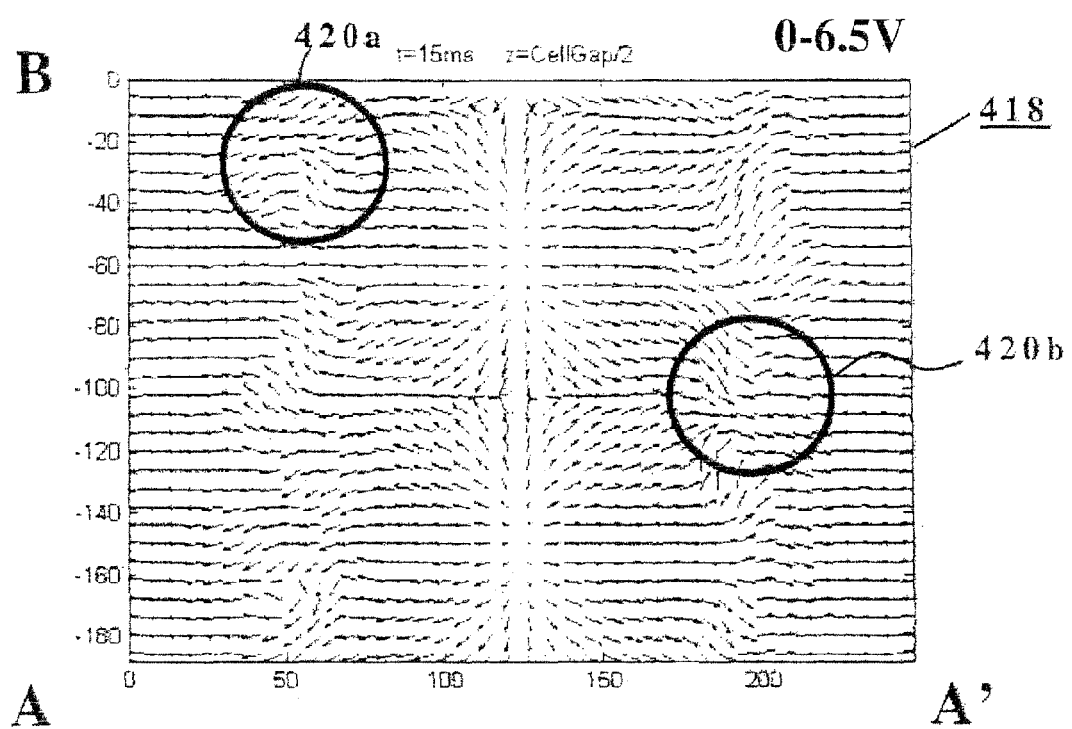

FIG. 10 illustrates an example display module 500 that includes a display driving device 502 for driving an LCD panel 504. The display driving device 502 includes a data driver module 506 for driving data lines (also referred to as source lines or column lines) of the LCD panel 504. The display driving device 502 also includes a scan driver module 508 for driving scan lines (also referred to as row lines) of the LCD panel 504.

A timing controller 510 in the display driving device 502 receives image data, and in response to the image data, supplies signals corresponding to the image data to the data driver module 506. The data driver module 506 in turn drives signals on data lines to appropriate voltage levels according to the signals corresponding to the image data, The timing of drivers in the data driver module 506 and scan driver module 508 are controlled by the timing controller 510.

In accordance with some embodiments of the invention, the image data received by the display driving device 502 includes compensation image data generated by a data compensation device 512. The compensation image data received by the display driving device 502 allows for the application of stepped voltage levels (multi-step voltage application or multi-step driving technique) within a frame period to selected ones of pixels in the LCD panel 504 under certain conditions.

A voltage (of a pixel signal) provided on a data line by the data driver module 506 is communicated through a TFT of the LCD panel for a selected pixel. The TFT is turned on by activating a scan line by the scan driver module 508. The voltage applied on the data line, when communicated through the TFT to a pixel, causes rotation of corresponding liquid crystal molecules.

Using the multi-step driving technique allows the gap between protrusions and slit patterns in an LCD according to some embodiments to be increased in size, such as to a distance that is greater than or equal to 25 μm (micrometers) at least at some portions between any pair of adjacent protrusion and slit pattern. If the multi-step driving technique is used, gap size between the protrusion and slit pattern can be increased without resulting in the problem of disclination of liquid crystal molecules.

In some embodiments, each slit pattern can have a plurality of jagged notches. When slit patterns with jagged notches are used in conjunction with the multi-step driving technique for pixel signals, the gap between a protrusion and a slit pattern that has jagged notches can be further increased in size to range between 30 μm and 50 μm, at least between some portions of the protrusion and slit pattern, without the problem of disclination of liquid crystal molecules.

By providing a larger gap between protrusions and slit patterns, an MVA LCD can be configured to have a reduced density of the protrusions and slit patterns. This will effectively increase the aperture ratio (the ratio of light transmissible area) and improve the brightness of the LCD.

In some embodiments, each protrusion has a plurality of branches, which are spaced apart from and located opposite respective edge portions of a pixel electrode. Each pixel electrode is divided into a plurality of partial electrodes by slit patterns and neighboring or adjacent partial electrodes are connected to each other by a joint connector. Each joint connector has a first part and a second part. The first part extends in a direction that is generally perpendicular to the direction of the protrusions, and the second part extends in a direction that is generally parallel to the data lines. In some embodiments, the second part of each joint connector completely overlaps the branch of an adjacent protrusion.

Figure 8:
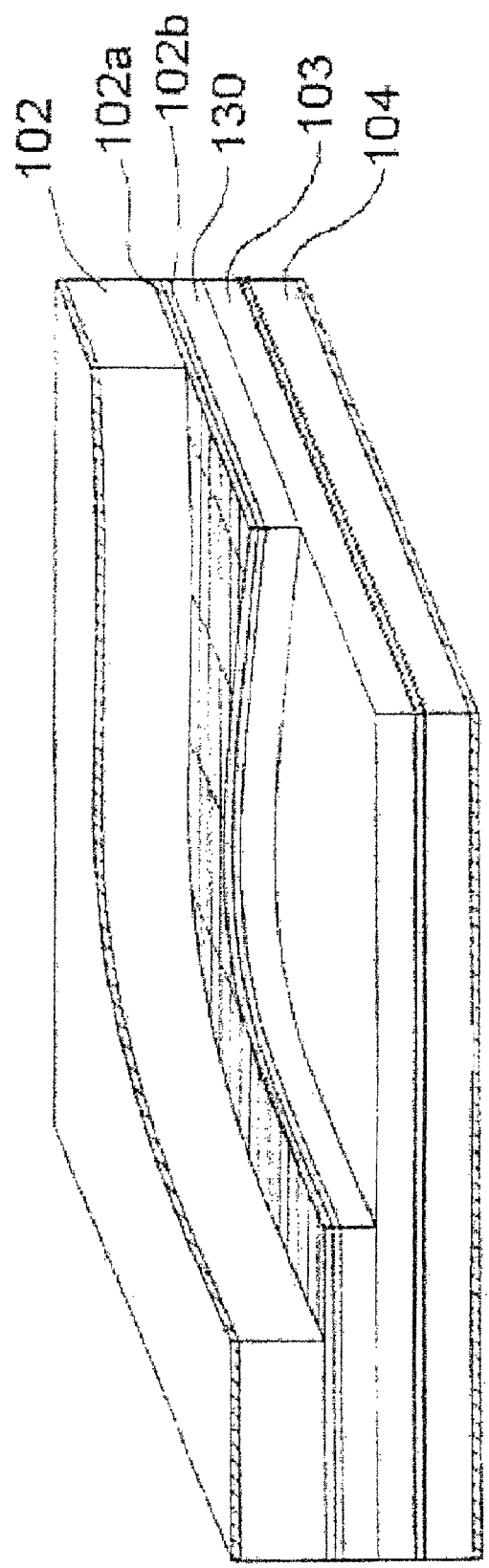
FIG. 8 is a perspective sectional view of an MVA LCD according to an embodiment.

According to an example embodiment, the LCD is a thin film transistor (TFT) LCD. As shown in FIG. 8, the TFT LCD includes a first substrate 102 which may be provided with a light shielding array, e.g., a black matrix (BM) (not shown in FIG. 8), a plurality of color filters 102a and a common electrode 102b. The first substrate 102 is also referred to as a color filter substrate.

The TFT LCD also includes a second substrate 104, which includes TFTs, data lines, scan lines, and other structures that are part of pixel regions on the second substrate 104. The second substrate 104 is also referred to as a TFT substrate. A spacer (not shown) is provided between the first substrate 102 and the second substrate 104 to define a gap between the two substrates. A liquid crystal layer 103 is provided between the substrates 102 and 104.

FIG. 1 shows a portion of an LCD according to an embodiment which is provided on the TFT substrate 104 (FIG. 8). The TFT substrate 104 includes a plurality of gate lines (or scan lines) 106 (which are generally parallel to each other), a plurality of data lines 108 (which are generally parallel to each other and perpendicular to gate lines 106), and a plurality of TFTs 109 and pixel electrodes 120. Each TFT 109 has a gate electrode electrically connected to a gate line 106, a source electrode electrically connected to a data line 108, and a drain electrode electrically connected to a pixel electrode 120. As used here, the term "source" and "drain" of a TFT are interchangeable.

When a scanning signal is activated on a respective gate line 106, the TFT 109 is turned on to provide the data signal (on a respective data line 108) through the TFT 109 to the pixel electrode 120. The data signal on the data line 108 that is provided to through the TFT 109 to the pixel electrode is also referred to as a pixel signal. The TFTs 109 and pixel electrodes 120 are generally arranged in a matrix at respective pixel regions proximate intersections of respective gate lines 106 and data lines 108.

Each pixel electrode 120 is provided in the pixel area defined by two adjacent gate lines 106 and two adjacent data lines 108. In the LCD according to an embodiment a plurality of protrusions 130 are arranged in arrays on the color filter substrate 102. Also, a plurality of slit patterns 140 are arranged in arrays at the pixel electrodes 120 on the TFT substrate.

The protrusions 130 and slit patterns 140 are generally parallel to each other and are arranged in alternating fashion. Each protrusion and slit pattern extends generally diagonally across a pixel electrode. The pixel region depicted in FIG. 1 is separated into two halves by dashed line 121. In the upper half, the protrusions and slit patterns extend generally diagonally along a first direction, while in the lower half, the protrusions and slit patterns extend generally along a second direction that is generally perpendicular to the first direction.

The alternating arrangement of the protrusions and slit patterns means that there is a slit pattern interposed between two protrusions, and there is a protrusion between two slit patterns.

As depicted in FIG. 1, each slit pattern 140 is provided with a plurality of jagged notches 140a (to achieve a general teeth profile). The gap between a side of a protrusion 130 and a side of an adjacent slit pattern 140 is identified as c. The gap c is equal to the smallest depth a of the jagged notches 140a plus the gap b between the base of notches 140a with the smallest depth of protrusions 130. It is desirable for the gap c to be increased to reduce density of the protrusions and slit patterns in the LCD for increased aperture ratio of the LCD.

When the slit patterns 140 are not provided with the jagged notches 140a, and a conventional driving technique is used for the LCD, the gap (c) between the protrusions 130 and the slits 140 would have to be less than 25 μm (in some implementations) to avoid disclination of liquid crystal molecules. If the 25-μm gap is not provided, the liquid crystal molecules located in the area sandwiched between the adjacent protrusion and slit pattern are prone to disclination due to excessive transient variation of the driving voltage (bias voltage), leading to longer response time of pixels or image retention problem of displays.

However, if the multi-step driving technique of U.S. Ser. No. 11/198,141, is used, the disclination of liquid crystal molecules is reduced so that the gap c between said protrusions 130 and said slit patterns 140 does not have to be set below 25 μm. As a result, the gap c may be greater than or equal to 25 μm (at least between some portions of neighboring protrusion and slit pattern) without causing the disclination problem with the liquid crystal molecules.

Providing the slit patterns 140 with jagged notches 140a also allows for increasing the gap c. By using the jagged notches 140a in conjunction with using a conventional pixel signal driving technique, the response time is shortened (as compared to the response time when slit patterns 140 without the jagged notches 140a are used). As a result, the gap c between the protrusions 130 and the slit patterns 140 can be set be smaller than 30 μm to avoid disclination of the liquid crystal molecules.

If the multi-step driving technique is used, the gap c between the protrusions and the slits with jagged notches can be increased further to range between 30 μm and 50 μm without the disclination problem with the liquid crystal molecules.

Figure 2:
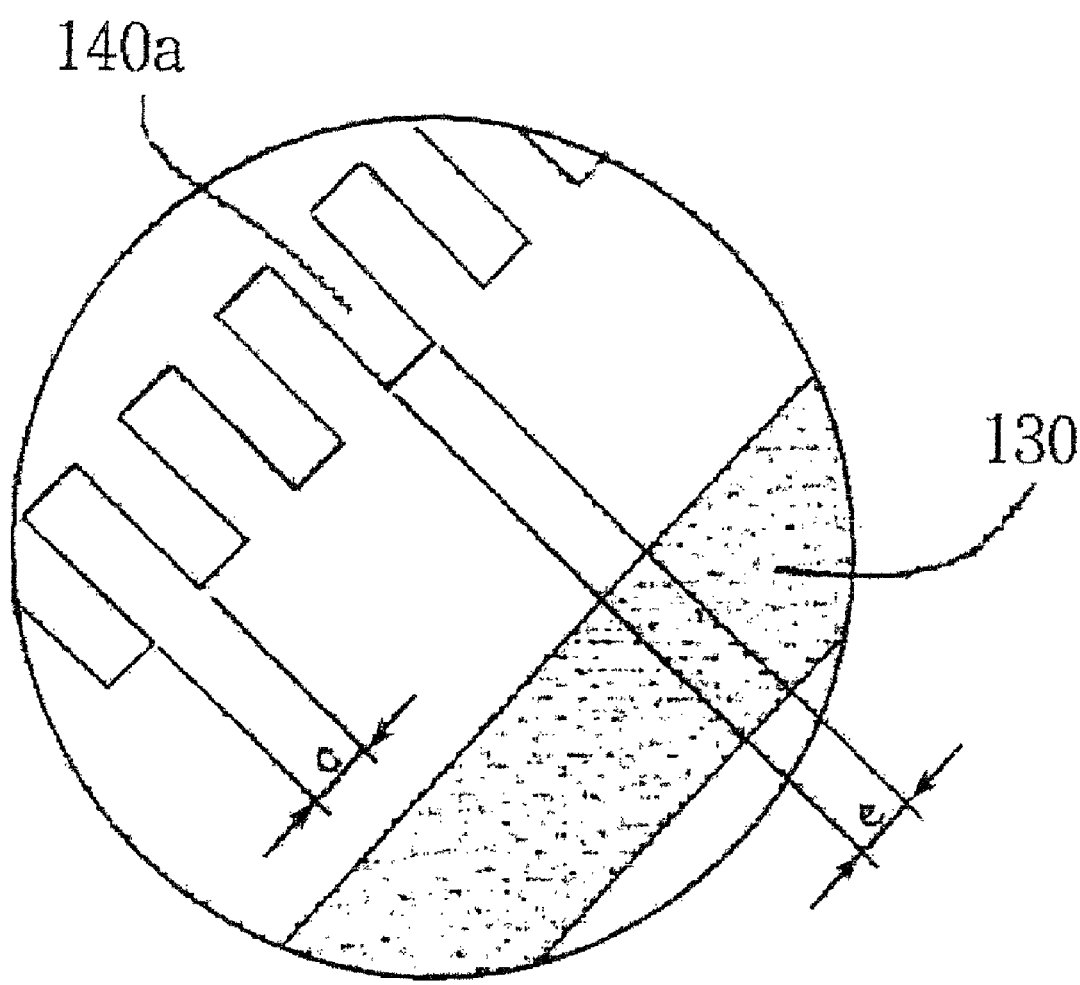

Additionally, the transmittance of the LCD is related to the gap d between the jagged notches 140a and the width e (see FIG. 2). One example of this relation is depicted in Table 1 (gap c is set to 35 μm and the smallest depth a is set to 14 μm).

TABLE 1

| d (μm) | e (μm) | Transmittance | d/(d + e) | (d + e) |
| --- | --- | --- | --- | --- |
| 4.5 | 2.5 | Excellent | 64.3% | 7.0 |
| 4 | 3 | Excellent | 57.1% | 7.0 |
| 3.75 | 3.25 | Excellent | 53.6% | 7.0 |
| 4 | 3.5 | Good | 53.3% | 7.5 |
| 4 | 4 | Good | 50.0% | 8.0 |
| 4.5 | 4 | Good | 52.9% | 8.5 |
| 5 | 4 | Good | 55.6% | 9.0 |

It can be seen from Table 1 that the design of the jagged notches 140a is such that the gap d and the width e add up to 7~9 μm (in some implementations) in order to obtain good transmittance.

Table 2 below illustrates how the gap d between the jagged notches 140a and the width e (see FIG. 2) relate to the response time achieved by using a conventional pixel signal driving technique, with the gap c set to 35 μm and the smallest depth a is set to 14 μm, in the depicted example.

TABLE 2

| d (μm) | e (μm) | Response time |
| --- | --- | --- |
| 4.5 | 2.5 | Good |
| 4 | 3 | Excellent |
| 3.75 | 3.25 | Excellent |
| 4 | 3.5 | Excellent |
| 4 | 4 | Excellent |
| 4.5 | 4 | Excellent |
| 5 | 4 | Poor |

Table 2 shows that the gap d between the jagged notches 140a should be no greater than 4.5 μm and the width e of the jagged notches 140a should be no less than 3 μm, in one implementation, in order to obtain a good response time.

In one example implementation, for improved transmittance and response time, the jagged notches 140a are arranged so that the gap d between the notches and the width e should add up to 7~8.5 μm.

In the LCD illustrated in FIG. 1, each protrusion 130 has a plurality of branches 130a, which are provided at locations directly opposite respective edges of the pixel electrode 120. In a region near a branch 130a, the long axis of the liquid crystal molecules will be aligned perpendicularly to the branch 130a. For liquid crystal molecules that are further away from a branch 130a, the long axis of the such liquid crystal molecules will be aligned perpendicularly to the adjacent slit pattern 140. To reduce variation of alignments of liquid crystal molecules in regions where a slit pattern 140 borders a branch 130a (close to an edge portion of the pixel electrode 120), such as to keep the variation of the alignments of liquid crystal molecules to no more than 45°, the angle formed by the branch 130a and the slits 140 (angle 141 in FIG. 1) is set to less than or equal to 45°, in one example embodiment. This will effectively reduce the chance of disclination occurring in the regions where slit patterns 140 border branches 130a.

However, the protrusions 130 and the pixel electrode 120 are separately formed on different substrates and misalignment between different substrates often causes the branch 130a not to be accurately placed opposite an edge portion of the pixel electrode 120 so that a darkened area appears at the area where slit patterns 140 border the pixel electrode as a result of disclination of the liquid crystal molecules.

Figure 4:
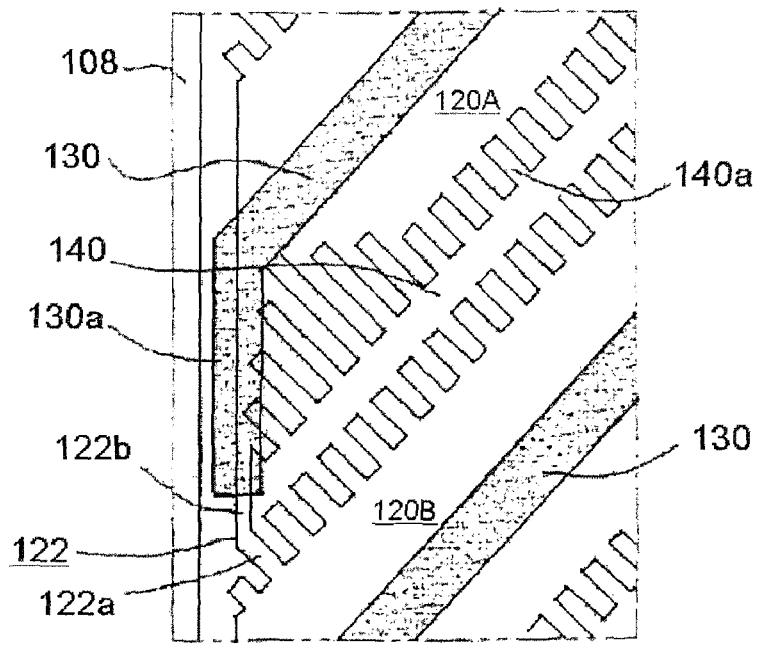

As shown in FIGS. 1 and 4, the pixel electrode 120 is divided by the slits 140 into four partial electrodes, e.g., 120A, 120B, 120C, and 120D. Adjacent partial electrodes are connected to each other via at least a joint connector 122. Each joint connector 122 has a first part 122a and a second part 122b (see FIG. 4). The first part 122a extends in a direction that is generally perpendicular to the direction of the protrusions 130. The second part 122b extends in a direction that is generally parallel to the data lines 108. In this embodiment, the second part 122b of each joint connector 122 does not completely overlap the branch 130a of the protrusion 130 (i.e., the second part 122b is not perpendicularly projected onto the substrate plane in exactly the same area as the branch 130a). The area in which the second part 122b does not overlap the branch 130a will appear darkened. In the darkened area, the liquid crystal molecules change their orientation very slowly when a voltage is applied. This reduces the contrast and response time, resulting in deteriorated display quality. If the two substrates are misaligned, causing the second part 122b not to overlap the branch 130a, the non-overlapped area will appear darkened.

Figure 5:
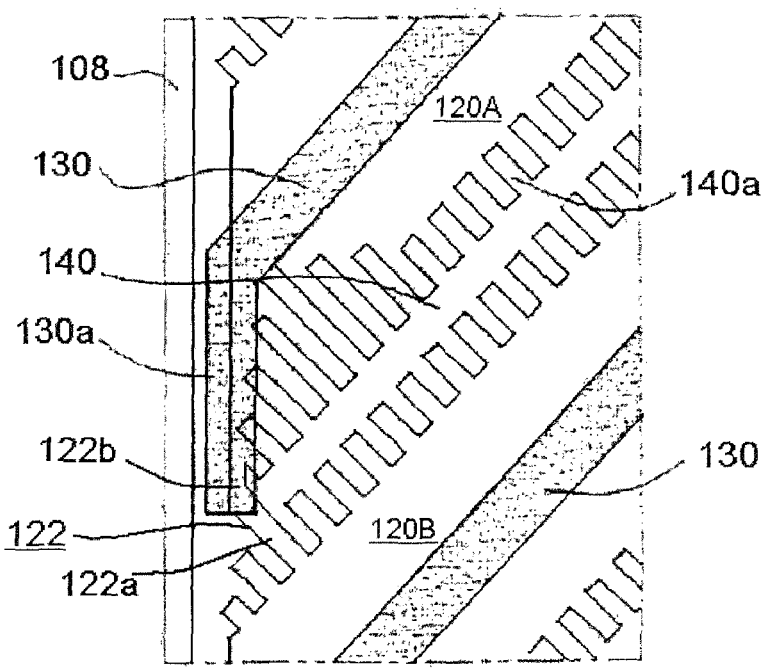

To address this issue, FIG. 5 shows that the second part 122b of each joint connector 122 completely overlaps the branch 130a of the protrusion 130 (i.e., the second part 122b is perpendicularly projected onto the substrate plane in exactly the same area as the branch 130a). This embodiment effectively reduces the above mentioned darkened area. Even when there is misalignment of the two substrates in the up-down direction as shown in FIG. 5, this design can effectively reduce the darkened area.

Figure 3:
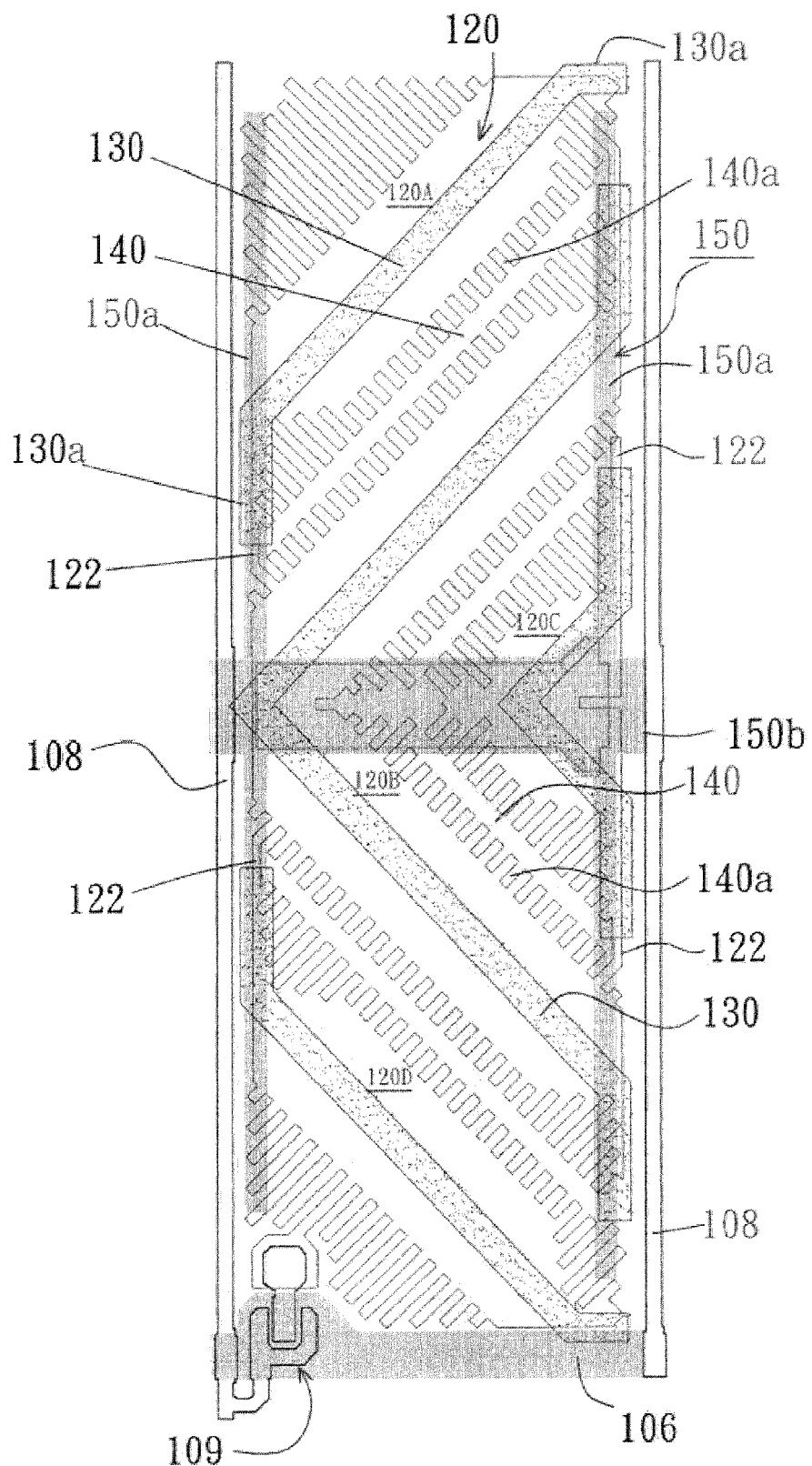

FIG. 3 shows a portion of an MVA LCD according to another embodiment. In this embodiment, each pixel area of the LCD is provided with a generally H-shaped storage capacitance electrode 150 (a capacitance conductor line) that has two side parts (or conductor lines) 150a connected to each other via a central part 150b. As shown in FIG. 3, the two side parts 150a are provided in the pixel area at locations adjacent data lines 108. In contrast to the capacitance electrode of a conventional LCD which is generally designed to have only the central part 150b, the capacitance electrode 150 according to the embodiment of FIG. 3 has the two side parts 150a that can provide an additional storage capacitance where it overlaps the pixel electrode 120.

The capacitance electrode 150 generally is created along with gate line 106 and gate electrode by patterning a gate metal layer. The capacitance electrode 150 and gate line 106 are shown in FIG. 3 as a gray pattern for easier understanding. The gate metal layer is generally formed of an electrically conductive but opaque metal, such as aluminum, chromium, tantalum, or molybdenum. The two side parts 150a of the capacitance electrode 150 may be used as an ancillary light shielding layer to shield light leakage.

Figure 6:
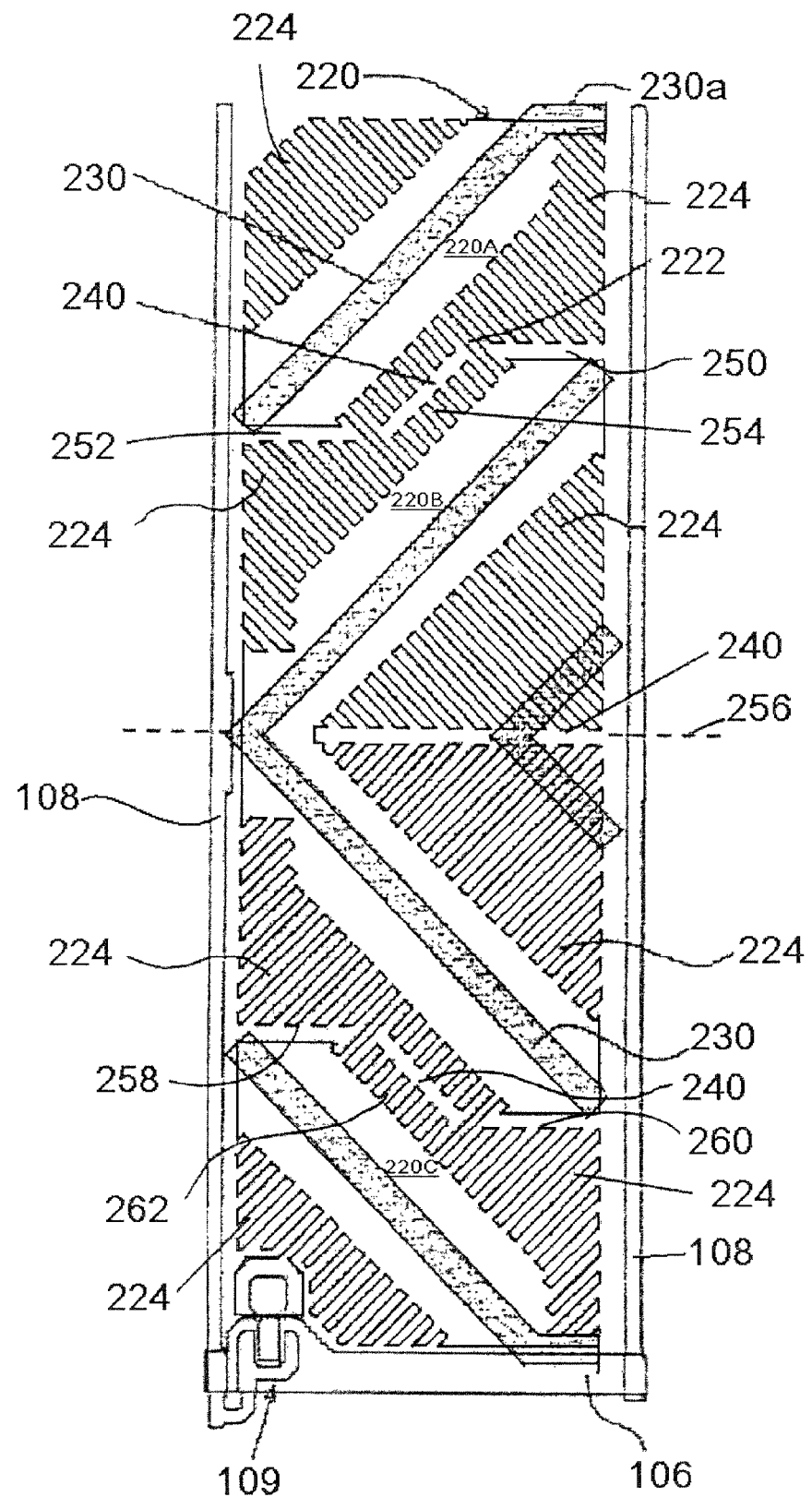

FIG. 6 shows a portion of an MVA LCD according to yet another embodiment. In this embodiment, a plurality of protrusions 230 are arranged in arrays on the color filter substrate. A plurality of slit patterns 240 are arranged in arrays at the pixel electrodes 220. The protrusions 230 and slit patterns 240 are arranged in an alternating fashion and the slit pattern 240 located between two adjacent protrusions 230 has a general serpentine-shaped profile. In the upper half of the pixel area above dashed line 256, the general serpentine-shaped profile of the slit pattern 240 is defined generally by edge segment 250, edge segment 252, and an intermediate segment 254 interconnecting the edge segments 250, 252. In the lower half of the pixel area below dashed line 256, the general serpentine-shaped profile of the slit pattern 240 between protrusions 230 is defined generally be edge segment 258, edge segment 260, and intermediate segment 262 interconnecting the edge segments 258, 260.

As shown in FIG. 6, the pixel electrode 220 is divided by the slit patterns 240 into three partial electrodes, e.g., 220A, 220B, and 220C. Adjacent partial electrodes are connected to each other via at least one connector joint 222. The partial electrodes 220A, 220B, and 220C each has a plurality of projections 224, which extend in a direction that is perpendicular to that of the protrusions 230. Note that the projections of each partial electrode forms the notches of the respective slit pattern. The projections 224 of the partial electrodes depicted in FIG. 6 are longer than the projections of partial electrodes depicted in FIG. 1. In the FIG. 6 embodiment, the protrusions 230 are not provided with any branches that are parallel to the data lines, which would have been located opposite an edge portion of the pixel electrode adjacent to the data lines. The projections 224 are extended because of the removal of the branches in these locations. By eliminating the branches in these locations, effective reduction of darkened areas caused by misalignment of the branches and pixel electrode edge portions can be achieved.

Figure 7:
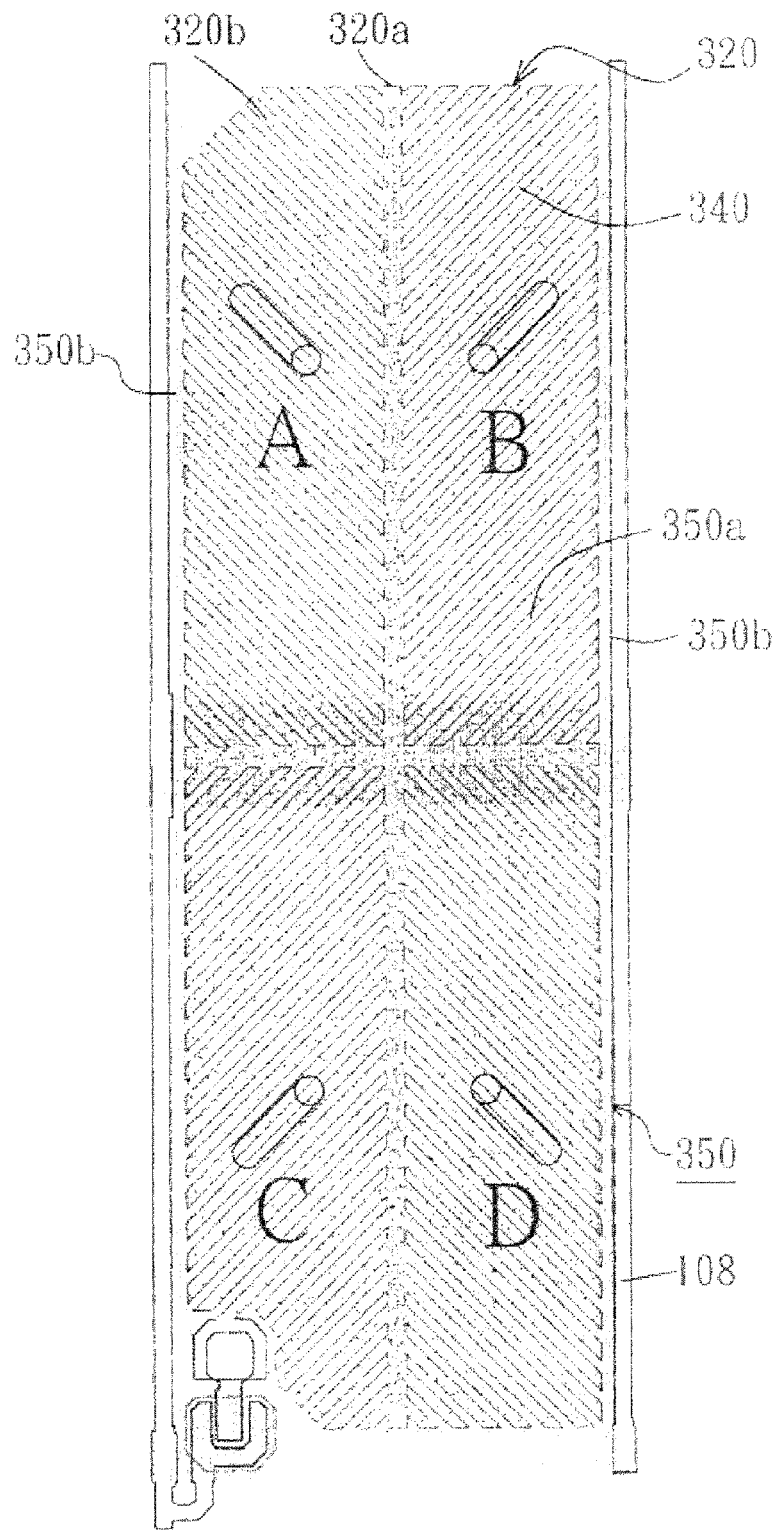

FIG. 7 shows a portion of an MVA LCD according to yet a further embodiment. Compared with the MVA LCD illustrated in FIGS. 1 to 6, the LCD shown in FIG. 7 is provided with a plurality of slit patterns 340 arranged in arrays and is able to achieve the desired viewing angle without provision of protrusions on the color filter substrate. As shown in FIG. 7, the pixel electrode 320 has a generally cross-shaped main body 390a and a plurality of projections 320b formed by extension of the generally cross-shaped main body 320a. In the LCD shown in FIG. 7, each pixel includes four domains, A, B, C, and D, wherein the orientation of the liquid crystal molecules are set to four different directions in order to effectively improve the LCD viewing angle performance.

Each pixel area is also provided with a storage capacitance electrode 350, which has a cross-shaped central part 350a and two side parts 350b. The cross-shaped central part 350a is formed generally at a location that is opposite the cross-shaped main body 320a of the pixel electrode 320. The two side parts 350b are connected to each other via the cross-shaped central part 350a and are placed separately in the pixel area at a location adjacent the data lines 108. Compared with the storage capacitance electrode in the conventional LCDs that generally has only the transverse portion of the above-mentioned cross-shaped central part 350, the storage capacitance electrode 350 has two side parts 350b and a central part 350a that includes both transverse and vertical portions to provide an additional storage capacitance. The capacitance electrode 350 is created along with the gate line 106 and gate electrode of the TFT, by patterning a gate metal layer. The capacitance electrode 350 and gate line 106 are shown in FIG. 7 as a gray pattern. As the gate metal layer is formed by electrically conductive but opaque metal, such as aluminum, chromium, tantalum, or molybdenum, the vertical portion of the central part 350a and two side parts 150b of the capacitance electrode 350 can be used as an auxiliary light shielding layer to shield from any leaked light.

The multi-step driving technique can also be used with the FIG. 7 embodiment to achieve reduced disclination of liquid crystal molecules.

In the LCDs shown in FIGS. 1 to 6, a plurality of protrusions are arranged in arrays on the color filter substrate and a plurality of slit patterns arranged in arrays at the pixel electrode on the TFT substrate. Alternatively, such arrangements can be swapped such that slit patterns are provided at the common electrode of the color filter substrate and protrusions are provided on the TFT substrate. Alternatively, both protrusions and slit patterns can be provided on each of the color filter substrate and TFT substrate (e.g. protrusions provided on both the color filter substrate and TFT substrate, and slit patterns provided on both the color filter substrate and TFT substrate).

The process used to form said protrusions is described below. To form the protrusions on the color filter substrate, first the surface of the color filter substrate is coated with photoresist and a predefined pattern is provided (refer to protrusion shown in FIGS. 1 to 6). Then the patterned photoresist is developed into protrusions. Next, the slit patterns are formed along with the pixel electrodes.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A liquid crystal display comprising:
    first and second substrates;
    a liquid crystal layer between the first and second substrates;
    a plurality of gate lines and data lines provided on the second substrate, wherein the gate lines and data lines are arranged to form a plurality of pixel areas arranged in a matrix;

a plurality of pixel electrodes provided in the pixel areas;
first structures formed on the first substrate; and
second structures formed on the second substrate, the first and second structures to regulate orientation of the liquid crystal layer so that when a voltage is applied, liquid crystal molecules of the liquid crystal layer are aligned in predetermined oblique directions;
wherein a gap between the first and second structures is greater than or equal to 30 μm, wherein the second structures include a plurality of slit patterns that are provided at the pixel electrodes and each of the slit patterns is provided with a plurality of jagged notches, wherein the first structures include a plurality of protrusions provided on the first substrate;
wherein:
  each of the protrusions is provided with a plurality of branches, the branches being provided opposite respective edge portions of a pixel electrode;
  each of the pixel electrodes is divided by the slit patterns into a plurality of partial electrodes, and neighboring partial electrodes being connected by at least one connector joint.

2. The liquid crystal display of claim 1, wherein the first and second structures are generally parallel to each other and are arranged in an alternating arrangement.

3. The liquid crystal display of claim 1, wherein the liquid crystal layer includes liquid crystal molecules that are generally perpendicular to a main surface of the first substrate when no substantial electric field is applied to the liquid crystal layer.

4. The liquid crystal display of claim 1, comprising a multi-domain vertical alignment liquid crystal display.

5. The liquid crystal display of claim 1, wherein each connector joint has a first part and a second part, wherein the first part extends generally perpendicularly to the protrusions, and the second part extends generally parallel to the data lines, and wherein the second part of each connector joint completely overlaps the branch of an adjacent protrusion.

6. A liquid crystal display comprising:
first and second substrates;
a liquid crystal layer between the first and second substrates;
a plurality of gate lines and data lines provided on the second substrate, wherein the gate lines and data lines are arranged to form a plurality of pixel areas arranged in a matrix;
a plurality of pixel electrodes provided in the pixel areas;
first structures formed on the first substrate;
second structures formed on the second substrate, the first and second structures to regulate orientation of the liquid crystal layer so that when a voltage is applied, liquid crystal molecules of the liquid crystal layer are aligned in predetermined oblique directions;
wherein a gap between the first and second structures is greater than or equal to 30 μm, wherein one of the first structures and the second structures include a plurality of slit patterns and each of the slit patterns is provided with a plurality of jagged notches; and
a plurality of storage capacitance electrodes that are separately provided in the corresponding pixel areas, each storage capacitance electrode being generally H-shaped and having a central part and two side parts, the two side parts being connected to each other via said central part;
wherein each pair of a capacitance electrode and a pixel electrode form a storage capacitance unit. each connector joint has a first part and a second part, wherein the first part extends 7. The liquid crystal display of claim 6, wherein the first structures include a plurality of protrusions provided on the first substrate, and the second structures include a plurality of slit patterns that are provided at the pixel electrodes.

8. The liquid crystal display of claim 6, wherein the first structures include a plurality of slit patterns provided on the first substrate, and the second structures include a plurality of protrusions provided on the second substrate.

9. The liquid crystal display of claim 6, wherein the first structures include a plurality of slit patterns provided on the first substrate, and the second structures include a plurality of slit patterns provided at the pixel electrodes.

10. The liquid crystal display of claim 7, wherein:
each of the protrusions is provided with a plurality of branches, the branches being provided opposite respective edge portions of a pixel electrode;
each of the pixel electrodes is divided by the slit patterns into a plurality of partial electrodes, and neighboring partial electrodes being connected by at least one connector joint.

* * * * *